United States Patent [19]

Rolls et al.

[11] 4,377,478
[45] Mar. 22, 1983

[54] SEPARATING ONE LIQUID FROM ANOTHER

[75] Inventors: George H. Rolls, Lymington; Andrew J. Beveridge, London; Ronald T. Challener, Dorset, all of England; William Stuart, New York, N.Y.

[73] Assignees: Star Offshore Services Limited, Aberdeen, Scotland; Oil Mop (UK) Limited, Dorset, England

[21] Appl. No.: 190,882

[22] PCT Filed: Jul. 31, 1979

[86] PCT No.: PCT/GB79/00128
§ 371 Date: Mar. 31, 1980
§ 102(e) Date: Mar. 31, 1980

[87] PCT Pub. No.: WO80/00355
PCT Pub. Date: Mar. 6, 1980

[30] Foreign Application Priority Data

Jul. 31, 1978 [GB] United Kingdom ............... 31680/78
Oct. 4, 1978 [GB] United Kingdom ............... 39254/78

[51] Int. Cl.³ .......................................... E02B 15/04
[52] U.S. Cl. ............................. 210/242.3; 210/242.4; 210/924
[58] Field of Search ............... 210/801, 924, 242.3, 210/242.4, 693

[56] References Cited

U.S. PATENT DOCUMENTS

| 3,523,611 | 8/1970 | Fitzgerald | 210/242 |
| 3,679,058 | 7/1972 | Smith | 210/924 |
| 3,686,870 | 8/1972 | Blomberg | 210/924 |
| 3,695,451 | 10/1972 | Schmidt, Jr. | 210/526 |
| 3,744,638 | 7/1973 | Rhodes | 210/924 |
| 4,052,313 | 10/1977 | Rolls | 210/924 |
| 4,146,477 | 3/1979 | Challener | 210/924 |

FOREIGN PATENT DOCUMENTS

| 1528855 | 6/1968 | France | 210/924 |
| 7225717 | 7/1972 | France | 210/924 |
| 2203400 | 10/1974 | France. | |
| 1372561 | 10/1974 | United Kingdom. | |

Primary Examiner—John Adee
Attorney, Agent, or Firm—Birch, Stewart, Kolasch & Birch

[57] ABSTRACT

Apparatus for, and method of, removing oil 33 from oil-contaminated water which is operable in heavy seas and which does not require more than one self-propelled craft for its efficient operation is disclosed. The apparatus comprises a collapsible net 31 which floats on the water and adsorbs oil in preference to water, and means to reciprocate the net between a floating disposition and a storage disposition, through desorbing means 36 to remove oil from the net.

12 Claims, 7 Drawing Figures

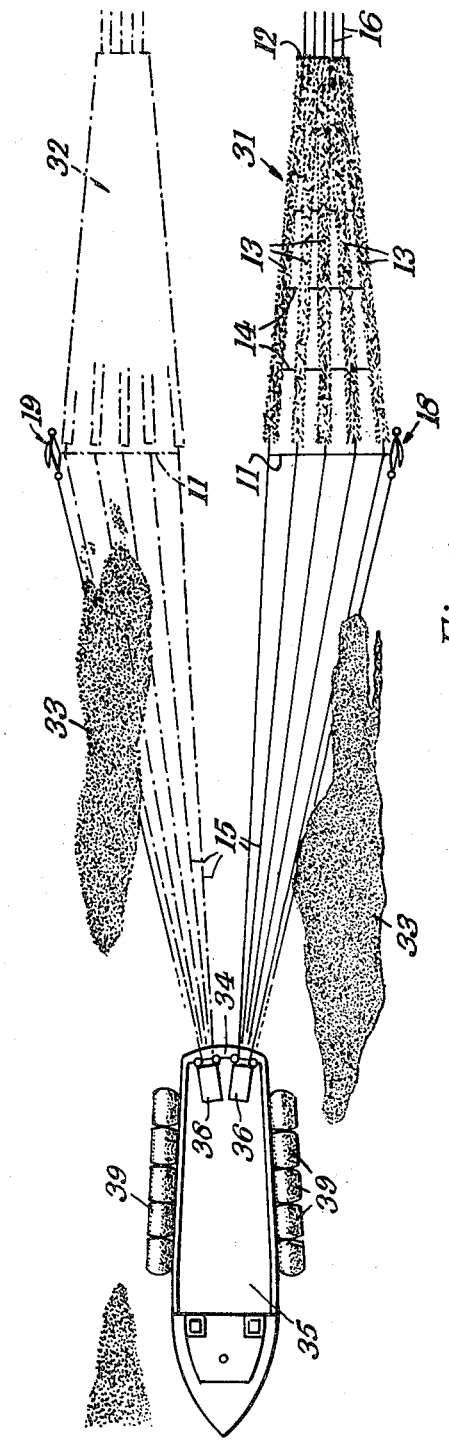
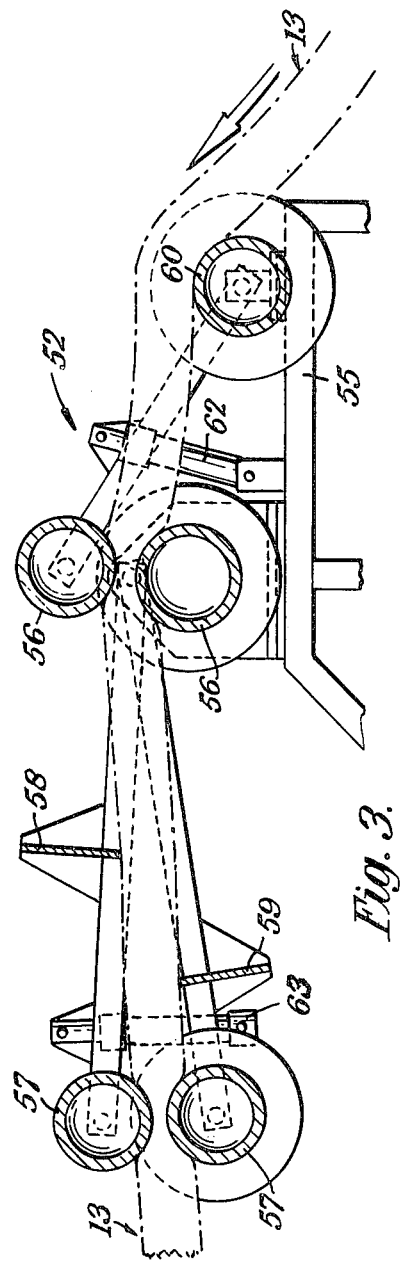
Fig. 1.
Fig. 3.

SEPARATING ONE LIQUID FROM ANOTHER

TECHNICAL FIELD

This invention relates to a method of and apparatus for separating one liquid from another and more particularly is concerned with a method of an apparatus for removing oil from oil-contaminated water.

BACKGROUND ART

Some proposals for the removal of oil from the surface of the sea involve confinement of the oil by a floating barrier (otherwise called a boom) followed by separation of the oil confined by the barrier from the water on which the oil is floating. Such separation can be effected by, for example, skimming devices or by use of oleophilic hydrophobic materials. Floating barriers can become difficult to manipulate in rough seas and, as wave height increases, they lose their effectiveness in confining oil. Usually, these proposals involve the use of more than one self-propelled craft. Difficulties can be experienced in co-ordinating the activities of the craft. The expenses of recovering oil tends to increase with the numbers of craft used. Proposals for the removal of oil unconfined by barriers tend to involve devices which extend considerable distances over the water surfaces in order to provide a satisfactory rate of oil collection. One proposal is described in U.S. Pat. No. 3,847,816 and takes the form of a "harvesting ring" and skimming device. An alternative method described in U.S. Pat. No. 3700593, involves deploying on the surface of the water a continuous loop of material which adsorbs oil in preference to water onto its surface and advancing the loop through a desorbing means. Skimmers operate far less effectively in heavy waves than in calm water. Continuous loops and harvesting rings which are big enough to deal with large oil slicks in the open sea are difficult to control unless the sea is comparatively calm. Often, more than one self-propelled craft is required.

DISCLOSURE OF INVENTION

The present invention seeks to provide a method of, and apparatus for, removing oil from oil-contaminated water which is operable in heavy seas where the prior art devices are not fully efficient, and which does not require more than one self-propelled craft for its efficient operation.

According to a first aspect of the present invention there is provided a method of removing oil from an oil-contaminated surface of a body of water utilizing a collapsible net of material which floats on the surface of the oil-contaminated water and which adsorbs oil in preference to water, comprising the steps of successively and reciprocatingly spreading the net in an outward movement from a storage disposition at an oil collection station to a floating disposition on the surface of the water where it adsorbs oil from the oil-contaminated water, gathering in the net from the floating disposition to the storage disposition in a return movement during which it passes through desorbing means at the oil collection station to remove oil from the net, and spreading the net again in a further outward movement from the storage disposition to the said or a further floating disposition for further adsorption of oil.

According to the second aspect of the present invention there is provided apparatus for removing oil from an oil-contaminated surface of a body of water comprising a collapsible net of material which floats on the surface of the oil-contaminated water and which adsorbs oil in preference to water, and means for successively and reciprocatingly advancing the net in an outward movement from the storage disposition at an oil collection station in which the net is gathered to a floating disposition on the surface of the water where it adsorbs oil from the oil-contaminated water, withdrawing the net from the floating disposition to the storage disposition in a return movement during which it passes through adsorbing means at the oil collection station to remove oil from the net, and advancing the net again in a further outward movement from the storage disposition to the said or a further floating disposition for further adsorption of oil.

Since the net of the present invention is easier to control than the loops and harvesting rings of the prior proposals, and since the invention does not require the use of a skimming device on the surface of the body of the water, it is more effective than the prior proposals in rough seas. No more than one self-propelled craft is needed to spread and gather the net.

It is to be noted that the net in the present invention is used to remove material from the surface of the body of water, rather than from the bulk of the water. It floats on, and extends over, the surface of the water and extends downwardly into the body of water by a distance which is only a small fraction of its width and length.

It is convenient to provide relative movement between the net and the body of water to carry the net away from the oil collection station in a continuation of the outward movement of the net. Having regard to such relative movement, we refer in this specification to the edge of the net nearest the oil collection station as the leading edge of the net.

Preferably the net is towed through the oil-contaminated water by a floating self-propelled craft.

Preferably the net is trapezium-shaped, with the longer of the two parallel edges of the trapezium provided by the leading edge of the net and the shorter of the two parallel edges provided by a trailing edge of the net. The stability of the trapezium-shaped net under tow is generally intermediate than of a rectangular net (whose stability is less) and a triangular net (whose stability is greater). A trapezium-shaped net is, however, preferred because it offers greater surface area for adsorption of oil than does a triangular net.

The present applicants had previously supposed that it was desirable to move oil-adsorbing ropes in a direction transverse to their length in order to adsorb large quantities of oil. With the present invention however, they have found to their surprise that, in the nets described herein, efficient collection of oil can be achieved with ropes moving across the water in a direction substantially parallel to their length.

The nets are therefore conveniently made up from a number of lengthwise, i.e. in the direction of said outward and return movements, strands formed from ropes of oil-adsorbent material (one suitable material is polypropylene) which extend between the leading and trailing edges of the net. These strands are connected by transverse bindings located at intervals along the length of the net. The bindings are of sufficient length to allow the width of the net when spread, i.e. in its floating disposition, to be many times larger than when gathered.

The ropes providing the lengthwise strands of the net are conveniently of fibrillated polypropylene. A suitable diameter is 75 cm. Each rope may comprise a rope core to which is woven a thick nap of material which preferentially adsorbs oil, such as polypropylene, the whole of the rope having a specific gravity less than unity, and in one preferred arrangement the rope takes the form disclosed in British Patent Specification Nos. 1314737 and 1314738.

Accordingly, the present invention also provides a net suitable for use in the method of the invention which comprises a plurality of lengthwise strands formed from ropes of fibrillated polypropylene.

The strands can be formed from single ropes. However, with this arrangement the waves of oil-contaminated water were found, in one experiment, to flow over the strands comparatively easily and without breaking so that there was less than the optimum degree of contact between the oil and the fibrillations of the ropes. It was found that if two ropes of 75 cm diameter were coupled together to form a single strand, the centres of the two ropes being spaced apart by 60 cm, the waves tended to break over the strand and contact of contaminated water with the ropes was then more intimate. Accordingly, it is preferred that each of the strands comprises two or more ropes and that the ratio of the rope diameter and the length is in accordance with the above numerical data coupled together.

Where the oil collection station is an advancing ship or other floating craft and the net is trailed from the craft, the width of the net when spread will normally be of the same order as, or greater than, that of the craft in order to provide a large area of contact of the net with the contaminating oil and thus high rates of recovery of oil from the water surface.

In such circumstances, towlines extending outward from the oil collection station to the opposite ends of the leading edge of the net will tend to diverge from one another when the net is fully spread. The tension in the towlines will tend to pull the front corners of the net towards one another.

To maintain the net fully spread, and also enable it to collect oil from an area to one side of the towing craft instead of from disturbed water in the wake of the craft, a biasing force can be applied to one front corner of the net to pull the net into a position in which it is offset from the craft and in which the leading edge of the net is in tension.

The biasing force is provided by a biasing means which can be, for example, a paravane device, trawl board, otter board or another device of aerofoil section. Hereinafter, such devices are referred to generically as "vanes".

A vane device or other biasing means can be attached to, or otherwise associated with, either the port front corner of the net so as to bring the net into an offset position on the port side of the craft, or the starboard front corner of the net to offset it to starboard. Indeed, a vane might be attached, to each front corner to place the leading edge under greater tension, and the two vanes could be of unequal size to provide whatever degree of offset is required.

To prevent the biasing means and the oil collecting station fouling each other when the net is being withdrawn from its floating disposition to its storage disposition, the biasing means can be detached from the net each time the net is withdrawn and reconnected to the net before or during re-advancement of the net towards its floating disposition.

Alternatively, the vane can be spaced from the front corner of the net, being connected to the net by a flexible line, enabling the vane to remain in the body of water during reciprocation of the net. In such an embodiment, it may be convenient to guide the line around a guide roller at the collecting station during such time as the net is being withdrawn into its storage disposition and moved outwardly to its floating disposition.

In another alternative, the vane is connected to the oil collecting station independently of the net, by a line or lines by which it can be withdrawn into the oil collecting station after use and by which its orientation in the water can be controlled. The line, or one of the lines, acts as a messenger wire to which one front corner of the net is connected in use and along which it travels during the reciprocatory motion of the net.

The vane itself is preferably of neutral buoyancy and is held on the surface of the water by one or more floats. The assembly of vane and floats is so arranged that the vane itself is on the point of total immersion and the floats are floating, so that the assembly will closely follow the wave of movement on the water surface (except for any oscillations out of such a path of movement which arise as a result of its having a natural period of oscillation). Any tendency for the vane to rise in the water will be opposed by the consequent loss of buoyancy when one or both floats are lifted away from the water surface by such rising movement.

It is preferable to provide some means of controlling the magnitude of the biasing force. Where the biasing means is a vane, the control means can be a line which can be advanced from or drawn into the oil collection station to change the angle of attack of the vane in the water. It is particularly desirable to provide such a control means where the biasing means remains in the water while the net is reciprocated, so that the angle of attack may be reduced for bringing the vane back to the collection station after use.

By bringing the lengthwise strands of the net into positions in which they are close to one another as the net is passed through the desorbing means, the width of the desorbing means can be kept relatively small. The desorbing means can comprise one or more pairs of rollers having a nip into which the net is gathered to squeeze oil from its surface. The desorbing means may comprise additionally, or alternatively, one or more scraper surfaces or blades to scrape oil from the net. Preferably, the desorbing means is constituted by a desorption unit which is of a shape and size suitable for transfer from one location to another as land or air freight using conventional, container handling equipment. Conveniently, the oil removed from the net flows from the desorbing means into floating, flexible containers which can readily be towed away from the collection station without unduly interfering with the work of removing oil from the contaminated water. Alternatively, oil can be stored in tanks on the collection station.

As a means for withdrawing the net to its storage disposition, there can be used a winch having a drum large enough to accommodate the full length of the net. The net is, in such an embodiment, connection to the winch by a plurality of tow ropes, and when the net is fully deployed, the leading edge of the net is some distance from the station. The winch drum can have flanges along its length to maintain the relative positions of the lengthwise strands of the net.

It is desirable that the winch (or other net withdrawing means) be mounted on the oil collection station close behind the desorbing means, and acts as a storage means when the net is not in use. Advantageously, the winch is provided as a winch unit which can readily by handled by conventional, container handling equipment.

To facilitate initial advancement of the net into its floating disposition, and re-advancement after oil has been removed from it, the trailing edge of the net can be provided with one or more trailing members carrying one or more device such as buoys or sea anchors which act to pull the net away from the collecting station when the latter moves relative to the water surface. During such development of the net, the drive to the winch is disconnected or reversed to allow unrolling of the net from the storage disposition. Additionally or alternatively, the desorbing means may have one or more pairs of powered rollers which may be desorbing rollers and which can be used to assist the winch to withdraw the net into the collecting station, and with the reverse direction of drive, advance of the net into its floating position. These powered rollers may be provided with fingers to grip the net and may have flanges to maintain the relative positions of the lengthwise strands of the net.

BRIEF DESCRIPTION OF DRAWINGS

Embodiments of the apparatus of the present invention will be described, by way of example, reference being made to the accompanying drawings, in which:

FIG. 1 is a view from above of oil collecting apparatus including two nets deployed from the stern of a self-propelled craft;

FIG. 3 is a section (in an enlarged scale) on the central plane of part of the desorption and winch unit shown in side elevation in FIG. 2;

BEST MODE OF CARRYING OUT THE INVENTION

Figure 2:
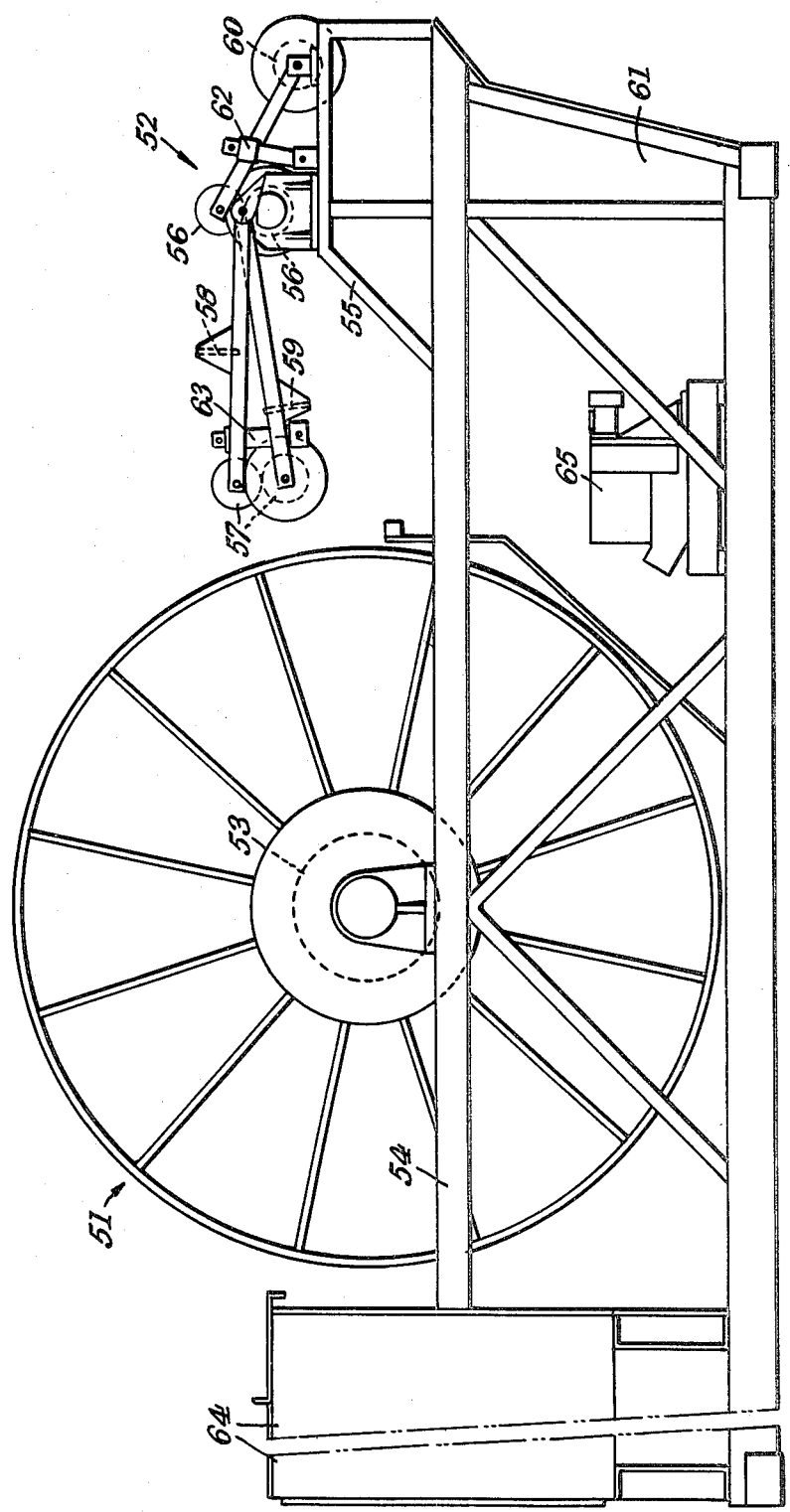
FIG. 2 is a side elevation (with cover plates removed) of a desorption and winch unit of the apparatus shown in FIG. 1.

The nets shown in FIG. 1 are of trapezium shape, having a leading edge 11, which incorporates a "mouth stringer" to support the net, and a trailing edge 12 between which there extend five lengthwise strands 13 which are linked together at intervals by resilient bindings in the form of ties 14. The length wise strands 13 are formed from fibrillated polypropylene rope, and are described in greater detail below with reference to FIG. 4. At the leading end of each of the strands 13 there is provided a tow rope 15 by which the net can be connected to a collecting station, and at the trailing end of each of the strands there is provided a trailing rope 16. The length of the strands 13 is of the order of 50 m.

FIG. 1 shows a first net 31 and (in phantom) a second, optional net 32 deployed on the surface of oil-contaminated water from the stern 34 of a vessel 35. Flexible oil storage tanks 39 are attached to the sides of the vessel. The net 31 is deployed on the port side of the vessel from a port side collecting unit 36 with five tow lines 15 (as previously mentioned). The net 32 when used is deployed on the starboard side of the vessel from a starboard side collecting unit 38 with five similar tow lines. A biasing means 18 (described below with reference to FIG. 4) is provided at the leading outer corner of the port-side net 31. A similar, though mirror-image, biasing means 19 is provided at the leading starboard corner of the net 32. The distance between the stern 34 of the vessel and the leading edges of the nets 31 and 32 is approximately 75 m. The total distance between the two biasing means 18 and 19 is typically about 40 m.

FIG. 2 shows schematically the construction of one of the desorption and winch units 36 and 38 shown in FIG. 1. The unit comprises a winch, indicated generally by reference numeral 51, and desorbing means indicated generally by reference numeral 52. The winch 51 comprises a winch drum 53 housed within a frame 54. The desorbing means 52 is carried by a frame 55.

In the embodiment illustrated the desorbing means and winch are shown as a single unit. It will however, be apparent to the skilled reader that they may be provided as separable units for ease of transport, for example, by air.

The desorbing means 52 comprises a first pair 56 and second pair 57 of desorbing rollers, first 58 and second 59 retractable scraper blades and a powered guide roller 60. The frame 54 defines a trough 61 within which is collected the oil which is removed from the net. A first hydraulic ram 62 may be used to vary the separation of the rollers 56 and a second ram 63 to vary the separation of the rollers 57. A power pack 64 provides a flow of pressurized oil to operate the rams 62 and 63, hydraulic motors (not shown) for driving the winch drum 53 and the rollers 56, 57 and 60 and a pump 65 to move oil out of the trough 61.

FIG. 3 shows the construction of the desorbing means in greater detail. For desorption, the strands 13 of the net pass over roller 60 which is flanged to guide the individual strands 13. The strands 13 then are squeezed in the nip of the pair 56 of desorbing rollers which are provided with traction bars (not shown) to assist advancement and withdrawal of the net. More oil is removed from the net as it passes between the scraper blades 58 and 59 to the second roller pair 57, the rollers of which are profiled to accommodate the individual strands 13. Finally, the net, from which oil has been desorbed, is wound onto the winch drum 53 (not shown in FIG. 3) which is also profiled.

Figure 4:
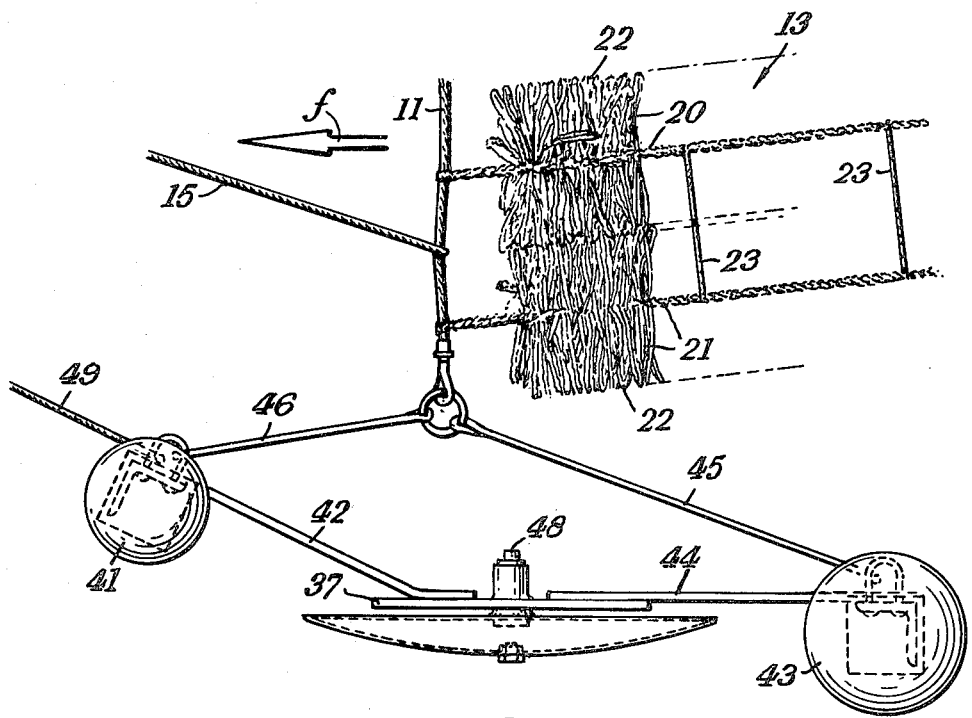
FIG. 4 is a view from above (in an enlarged scale) of the front, port corner of the port-side net shown in FIG. 1.
Figure 5:
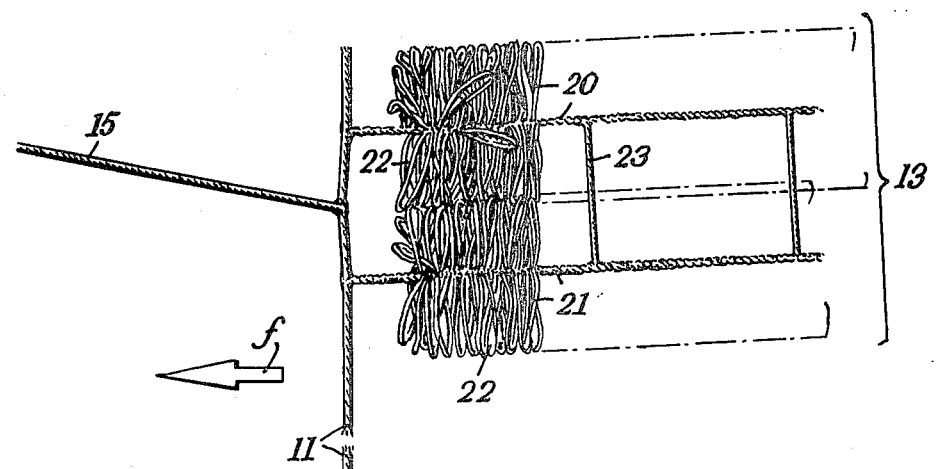
FIGS. 5 and 7 are plan views simular to that of FIG. 4 of alternative constructions.
Figure 5:
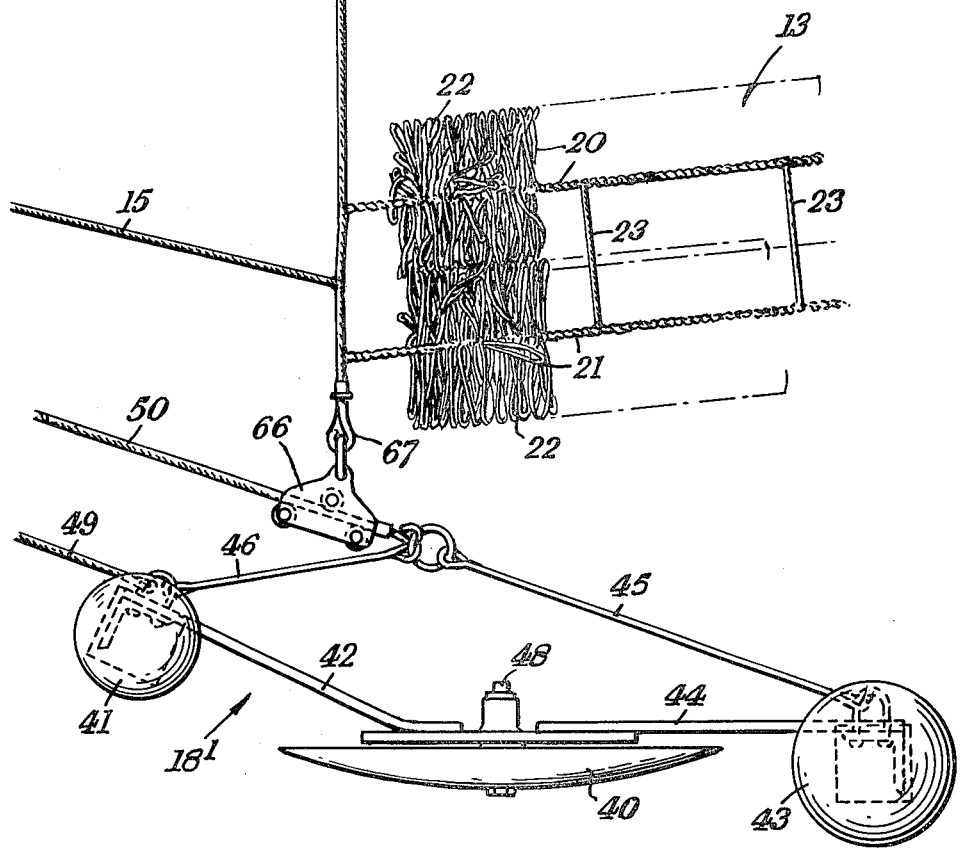

FIGS. 4 and 5 show how each lengthwise strand 13 of the net 31 is made up from two polypropylene ropes 20 and 21. Each rope has a very great number of polypropylene fibrillations 22 and has an overall diameter of approximately 75 cm. The ropes 20 and 21 are maintained with their centres spaced apart by a distance of approximately 60 cms. by a plurality of ties 23 which occur at intervals of 100 cms along the length of the strand.

The biasing means 18 shown in FIG. 4 comprises a hollow vane 40 shaped like a cap of a sphere, a small front float 41 mounted on a forward strut 42, a large rear float 43 mounted on a rear strut 44 and a harness 45 and 46 for connecting the vane 40 to the mouth stringer in the leading edge of the net. A control line 49 is attached to the strut 42 and, in use, extends to the oil collection station.

Figure 6:
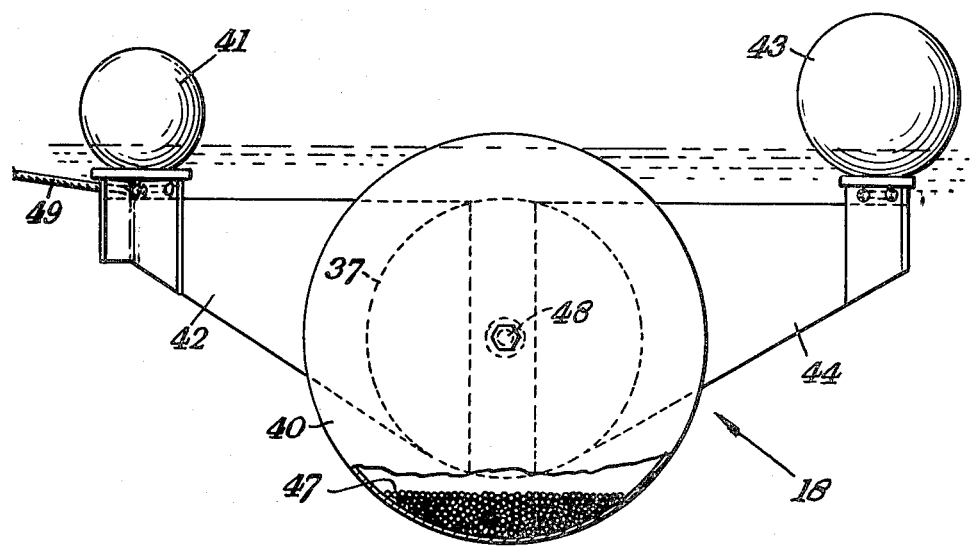
FIG. 6 is a side elevation of the hollow vane shown in FIGS. 4, 5 and 6, with part of the surface of the vane broken away to show the ballast within.

The vane 40 is hollow, as best seen in FIG. 6, and contains a quantity of lead shot 47 to provide sufficient ballast that the vane assembly has neutral buoyancy. The vane is free to rotate about a shaft 48 which carries a plate 37 on to which are welded the forward 42 and rear struts 44.

In use of the net 31, the tow lines 15 are connected to the winch drum 53. To gather in the net from its floating, spread disposition to its storage disposition, the winch is actuated so that the drum rotates in an anti-clockwise direction (as seen in FIG. 2) to pull the net through the water towards the stern 34 of the vessel 35 and gather together the strands of the net. In due course, the lengthwise strands 13 of the net are drawn over the stern. At this point, the winch is briefly halted to allow the biasing means 18 to be detached from the net. Then the net is drawn over guide roller 60 and through the nip of the first pair 56 of desorbing rollers. The first scraper blade 58 and second scraper blade 59 are moved into their operative positions, as shown in FIG. 3, to divert the strands 13 from a straight line course between the nip of the first pair 56 of desorbing rollers and the nip of the second pair 57 of desorbing rollers, to assist in removal of oil from the strands 13. Oil removed from the strands 13 and other parts of the net by the rollers 56 and 57 and the collects in the trough 61 whence it is pumped by pump 65 to the storage containers 39 (see FIG. 1). These storage containers conveniently comprise floating flexible cylindrical tanks of tough, plastics material. The cylindrical containers which are sold by the Dunlop Company, England, under the Registered Trade Mark "Dracone" are suitable for this purpose.

When the trailing edge of the net reaches the guide roller 60 the winch is stopped. The blades 58 and 59 are moved to a retracted position and the separation of the second pair 57 rollers is increased. The first pair 56 of rollers is driven in such a direction as to advance the net in an outward movement from the winch drum 53 so that at least the trailing edge of the net contacts the water. Redeployment of the net into the floating position shown in FIG. 1 is thereafter assisted by drag forces of water on the net and, if provided, by sea anchors attached to the trailing ropes 16, brought about by forward movement of the vessel 35 over the surface of the water. With the net fully deployed, it is towed by the vessel 35 through an area 33 of contaminated water so that oil in the water can be adsorbed onto the lengthwise strands of the net.

As will be appreciated from FIG. 4, movement through the water of the vane 40 when the net is being towed acts to generate as a tension in the leading edge 11 a biasing force which seeks to pull the port-side front corner of the net 31 out of the wake of the boat and into the area of sea on the port-side of the boat. This tendency is balanced by the tension in the tow ropes 15 and the drag forces on the net, and helps to ensure that the net is spread, with the full width of the net 31 exposed to the flow or oil-contaminated water past it. The vane 40 can rotate about the shaft 48, should the forces on it demand such motion, and the ballast 47 will move so as to remain at the lowest point within the vane. This behaviour resists any overturning couple which the vane may experience due to the action on it of the tension in the leading edge 11. When such tension acts to lift the vane out of the water one or both of the floats 41 and 43 will tend to be lifted out of the water, and resultant loss of buoyancy of the biasing means will resist the lifting force.

The angle of attack of the vane in the water is defined herein as the angle subtended between the planar surface of the vane 40 and the direction of movement of the biasing means through the water while under tow. This direction of movement is indicated in FIGS. 4 and 5 by arrow f. Thus, an angle of attack of zero is shown in these Figures. For spreading the net, the angle of attack will usually be finite but small, for example as shown in FIG. 1. The angle of attack is controlled by paying out the control line 49, or winding it in, to provide the desired magnitude of biasing force. When the net is to be gathered in, the angle of attack can be reduced to an angle less than that provided when spreading the net, in order to reduce the size of the biasing force.

FIG. 5 shows an alternative embodiment of biasing means 18[1]. Many of the components of the embodiment are similar to the corresponding components of the biasing means 18 and are identified by like references. A messenger line 50 extends between the harness 45 and 46 and the craft 35, and the angle of attack of the vane can be changed by lengthwise movement of line 49 relative to line 50. A carriage 66 running on the messenger line 50 is connected to the leading edge 11 of the net 31 by a swivel hook 67.

In use, the lines 49 and 50 are paid out from auxiliary winches (not shown) on the craft 35 and the net 31 is reciprocated through its outward and return movements with the carriage 66 running up and down the line 50.

Figure 7:
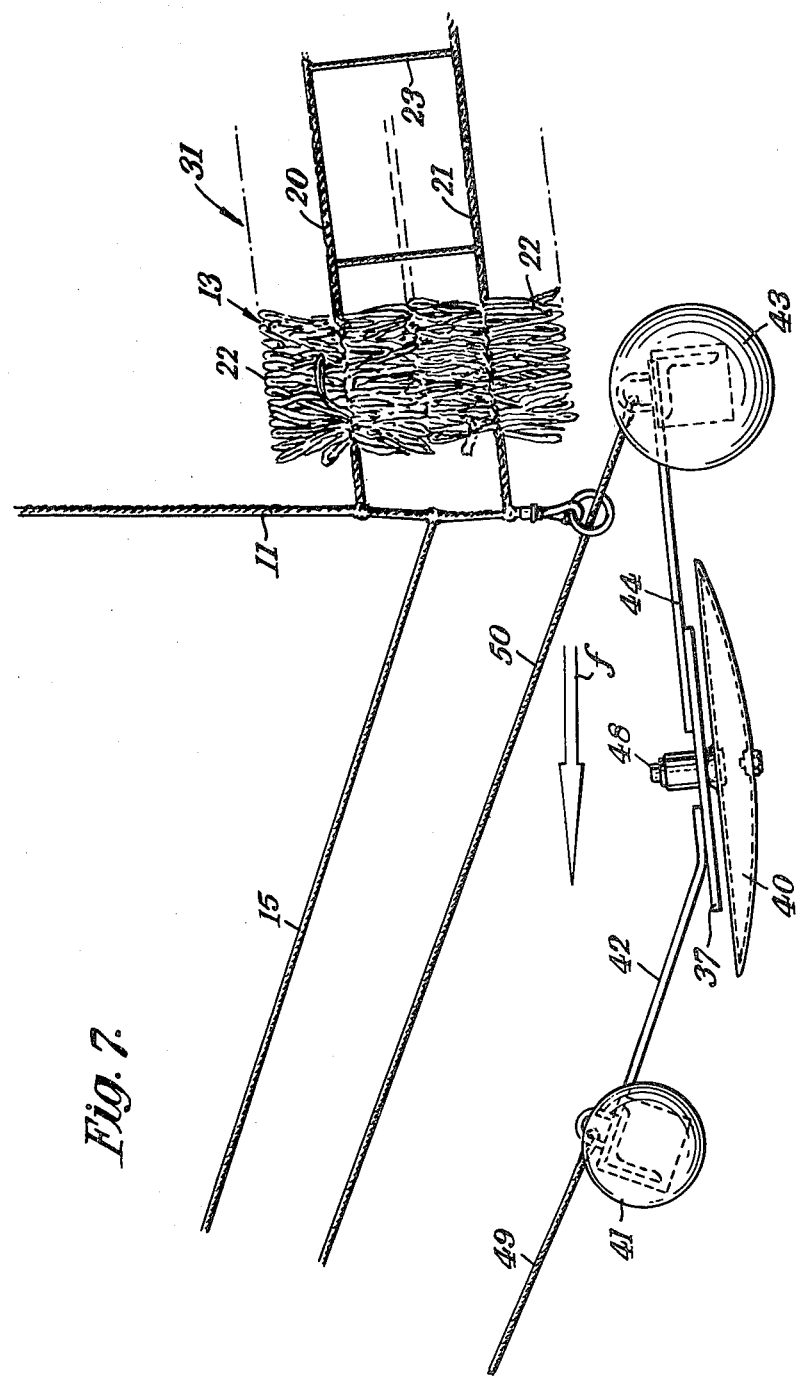

In a modification of the FIG. 5 embodiment, as shown in FIG. 7, the harness 45 and 46 is omitted, and the messenger line 50 extends to the frame 44 below the rear float 43. The carriage 66 is replaced by a ring around the line 50. In use, the ring takes up a position adjacent the rear float 43.

In each of the illustrated embodiments the angle of attack of the vane in use is usually in a range of from five to seven degrees, as shown in FIG. 7.

INDUSTRIAL APPLICABILITY

Unlike some of the prior proposals, the present method is reciprocatory rather than continuous. The applicants have found to their surprise that this is not a disadvantage because of the over-riding value of the method as a means of recovering oil from relatively heavy seas.

We claim:

1. Apparatus for removing oil from an oil-contaminated surface of a body of water comprising: a collapsible net; drive means at an oil collection station to advance the net in an advance movement from a storage disposition at an oil collection station at which the net is gathered to a floating disposition on the surface of the body of water in which the net is spread out to adsorb oil from the water, to withdraw the net from the floating disposition to the storage disposition in a return movement opposite to the advance movement during which the net is passed through desorbing means at the oil collection station to remove oil from the net and to subject the net repeatedly to the same advance and return movements between the storage disposition and the floating disposition for further adsorption of oil onto and removal of oil from the net and biasing means to spread out the net on the water in the floating disposition of the net.

2. An apparatus according to claim 1, wherein the net is shaped in the form of a quadrilateral in which the leading edge forms one side of the quadrilateral, and said one side being longer than the opposite side of the quadrilateral.

3. An apparatus according to claim 1 or 2, wherein the net comprises a number of strands of oil-absorbent material which extends between the leading edge and the trailing edge of the net and said strands being connected by transverse bindings located at intervals along the length of the strands.

4. Apparatus as claimed in claim 1 wherein the drive means comprises a pair of desorbing rollers drivable in one direction to secure said advance movement of the net and in the opposite direction to secure said return movement of the net.

5. Apparatus as claimed in claim 1, characterized in that the oil collection station is on a surface marine vessel which by a movement thereof over the body of water provides relative movement between the net and the body of water to carry the net away from the oil collection station in the advance movement of the net and said biasing means comprises a vane having the shape of a cap of a sphere to apply a biasing force to the net to spread the net and pull the net into a position in which it is offset from the line of said relative movement.

6. Apparatus as claimed in claim 5 characterized in that the vane is hollow and contains a quantity of ballast and is freely rotatable about an axis normal to the major surfaces of the vane.

7. Apparatus as claimed in claim 6 characterized in that the biasing means is an assembly of the vane and one or more floats, the assembly having neutral bouyancy.

8. Apparatus as claimed in claim 7 characterized in that the biasing means is connected to the oil collection station by one or more lines by means of which the angle of attack (as hereinbefore defined) of the vane can be controlled.

9. Apparatus as claimed in claim 8 characterized in that the biasing means is connected to the oil collection station by a messenger wire and wherein the net has means for its connection to the messenger wire in use to permit the net to travel along the messenger wire during its reciprocatory motion in use.

10. Apparatus as claimed in claim 4, characterized in that the drive means comprises a winch large enough to accommodate the whole of the net or substantially the whole of the net.

11. Apparatus as claimed in claim 3 characterized in that the strands are composed of ropes of fibrillated polypropylene.

12. Apparatus as claimed in claim 2 characterized in that each strand is composed of two of said ropes.

* * * * *